Sept. 5, 1967  J. M. LEHRY  3,340,456
VOLTAGE CONTROLLED POWER CONVERTER CIRCUITS
Filed Nov. 13, 1962  6 Sheets-Sheet 1

INVENTOR:
Jean Marie Lehry
BY Spencer & Kaye
Attorneys

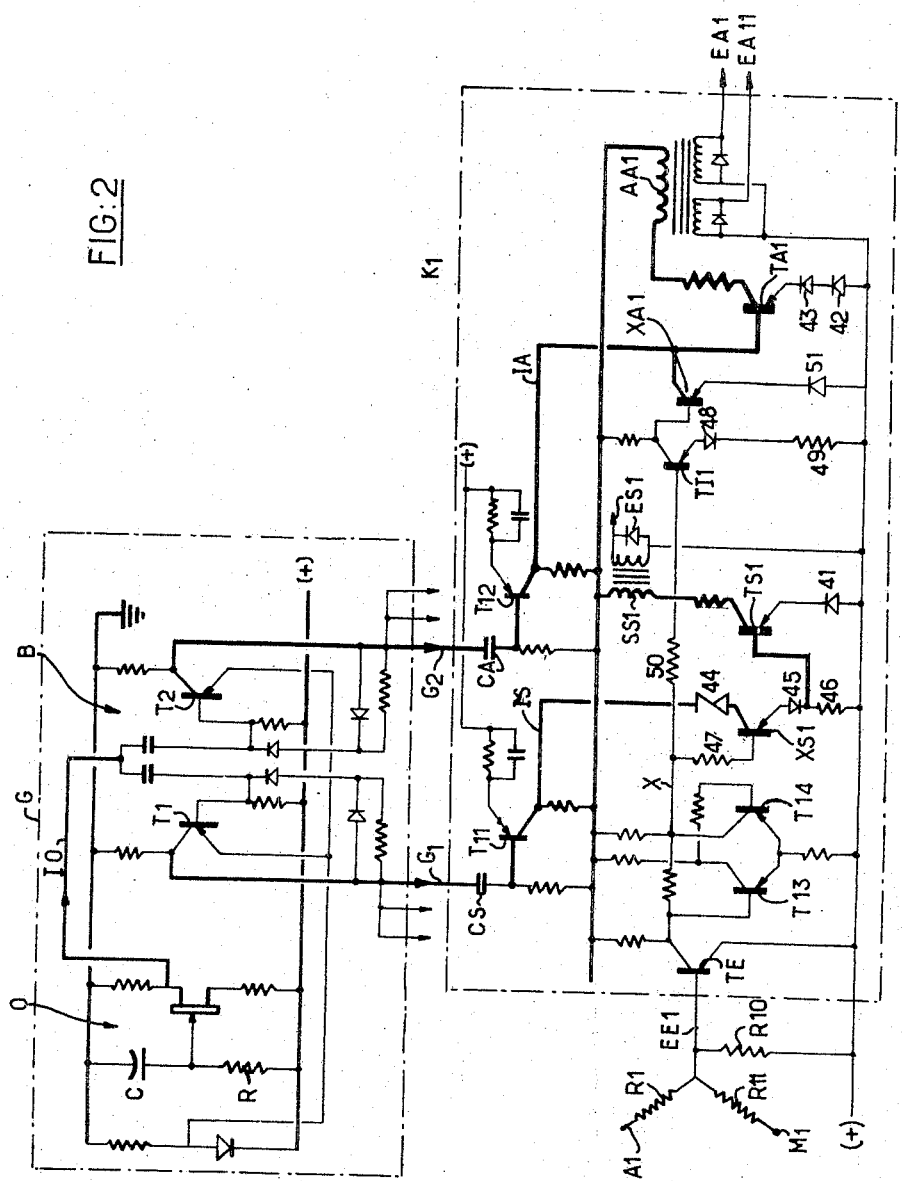

Sept. 5, 1967   J. M. LEHRY   3,340,456
VOLTAGE CONTROLLED POWER CONVERTER CIRCUITS
Filed Nov. 13, 1962   6 Sheets-Sheet 3
FIG: 3
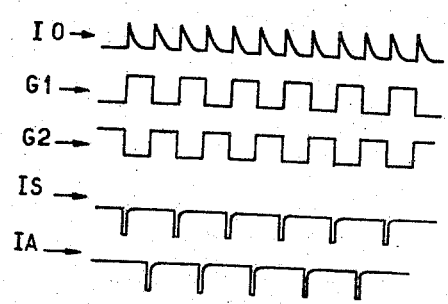
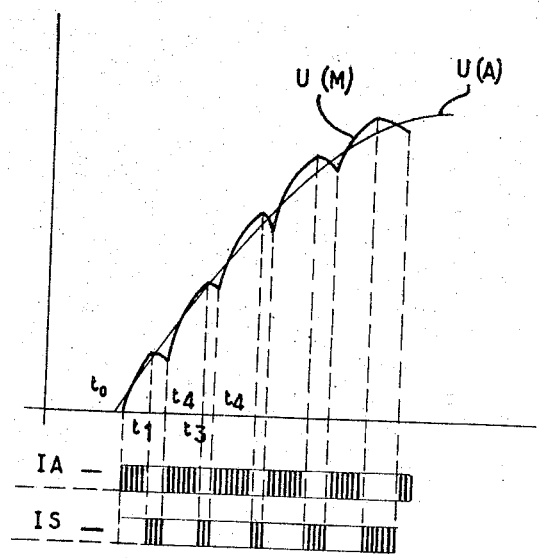
FIG:4
INVENTOR:
Jean Marie Lehry
BY *Spencer & Kaye*
Attorneys FIG:5
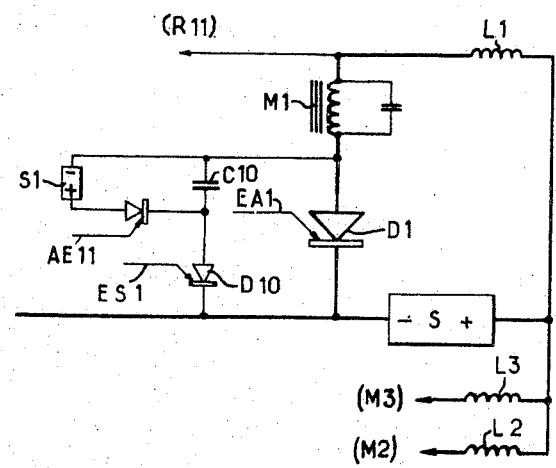
FIG:6
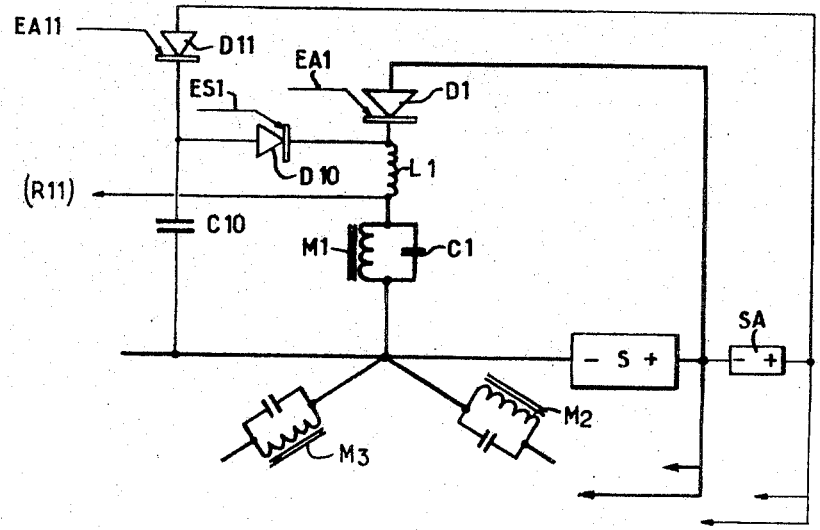

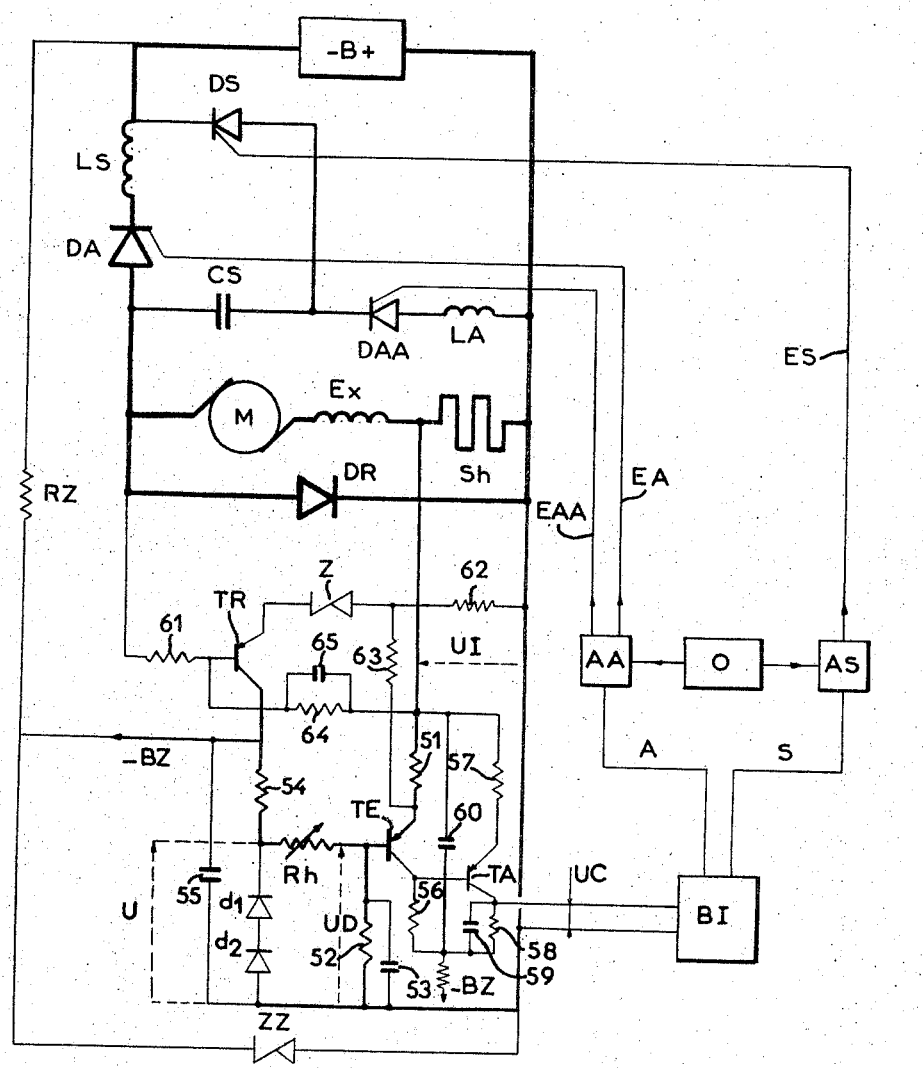
FIG:7

INVENTOR:
Jean Marie Lehry
BY Spencer & Kaye
ATTORNEYS

United States Patent Office 3,340,456
Patented Sept. 5, 1967

3,340,456
VOLTAGE CONTROLLED POWER CONVERTER CIRCUITS
Jean Marie Lehry, Paris, France, assignor to Cybermeca Societe Anonyme, Aubervilliers, France, a corporation of France
Filed Nov. 13, 1962, Ser. No. 236,895
Claims priority, application France, Nov. 13, 1961, 878,712; Oct. 30, 1962, 913,854
18 Claims. (Cl. 321—18)

The present invention relates to servo-control device of the type which comprises, between a source of D.C. power and at least one receiver, a switch unit having ignition and extinction electrodes respectively adapted to establish and interrupt the conductance of the unit by the action of appropriate electrical impulses.

In devices or converters of this type, the shape of the wave to be produced at the terminals of the receiver, generally a sinusoidal or quasi-sinusoidal wave of a given frequency, is predetermined, and the impulses controlling ignition an dextinction appear at the terminals of a source of A.C. or of impulses set up accordingly.

The present invention aims at producing a novel type of servo-control device or converter which is capable of reproducing very accurately, at the terminals of a receiver or receivers, no matter what their power, a variable voltage conforming to a reference voltage which appears at the terminals of a reference source, and particularly of a very low-powered reference source.

A device according to the invention essentially comprises a variation-detector comparator adapted to give a control signal each time the variation between the voltage at the terminals of the receiver and the reference voltage exceeds a given value, an impulse generator adapted to emit a continuous series of impulses at a frequency faster than the basic frequency of the reference voltage, and a directional filter device which is controlled by the comparator and adapted to direct the impulses towards one or other of the ignition and extinction electrodes according to whether the control signal is present or absent.

Such a device provides a series of particularly important advantages, among which the following may be emphasised:

The facility of eliminating parasitic harmonics;
The possibility of regulating the level of the voltage independently of its wave-form;
The low response-time constant;
The economy in highly-powered adjustment members, etc.

In fact, for example, any regulating action liable to be imposed in view of the type of applications envisaged need only be applied to the reference source, because the reference voltage appearing at the terminals of the source is faithfully reproduced at the terminals of the receiver or of a group of receivers.

The resultant extraordinary flexibility of control can be applied for example, to feeding electric A.C. motors of variable speed and frequency, and such an application is a special feature of the invention.

The characteristics and advantages of the invention will appear from the description which will now be given by way of example, with reference to the accompanying drawings, in which:

FIG. 2 is a detailed circuit diagram of an example of the impulse generator of the device, of the variation-detector comparator and for the transmission paths associated with one of the phases;

FIGS. 3 and 4 are diagrams explaining how the device operates;

FIGS. 5 and 6 are wiring diagrams showing two variants in the mounting of the commutation units such as are shown in FIG. 1;

FIG. 7 is a wiring diagram of a speed control device for D.C. motors, and

Figure 1:
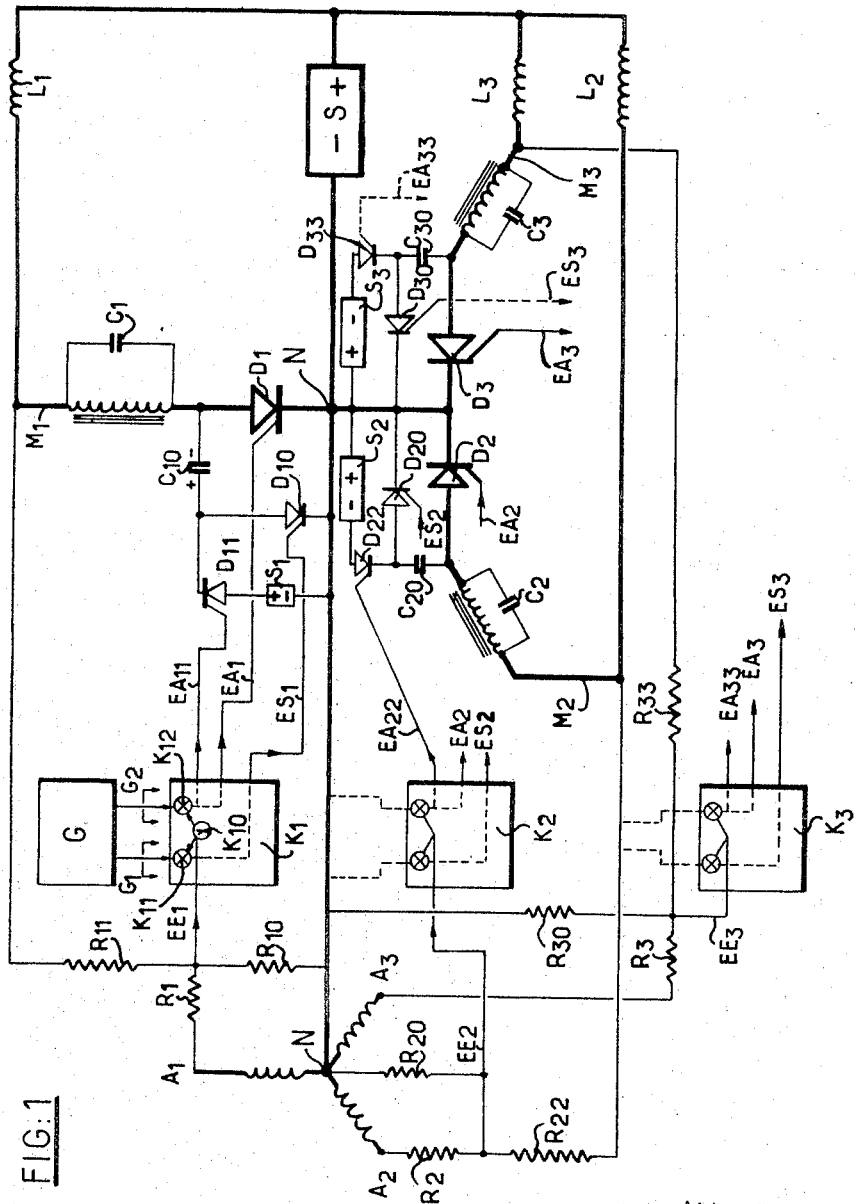
FIG. 1 is a simplified circuit diagram of a control device applied to feeding a three-phase receiver from a low-powered alternator.

According to the embodiment shown in FIG. 1, the invention is applied to feeding the field coils M1, M2, M3 of a three-phase motor, for example of the squirrel cage rotor type, from the terminals A1, A2, A3 of a small reference alternator A, within the framework of a device characterised particularly in that the armature of the reference alternator is mechanically coupled to the rotor of the motor M, while the field coils of the alternator A are adapted to create a field of energisation which rotates at a speed corresponding to a predetermined slip frequency (the rotor of the engine M and the inductor of the alternator A not being shown here).

The voltages emanating from the alternator A are supplied to the terminals of the motor M through a group of three amplifiers. Now a good energy yield requires sinusoidal voltages, whereas amplifiers with a sinusoidal output voltage give a yield which is necessarily limited and always below 65%. The wave device according to the present invention, which will now be described, enables excellent yields to be obtained by the use of non-linear communication members of the controlled rectifier kind, preferably of the dry thyratron type.

Thus the purpose is to reproduce faithfully, at the terminals M1, M2, M3 of a high-power three-phase motor, the reference voltages which are available at lower power at the terminals A1, A2, A3, these voltages for example being sinusoidal and of a variable frequency and amplitude. The motor and the alternator are mounted in star connection and their neutral terminals N are connected together and also connected to the pole, for example the negative pole, of a source S of D.C. power, of which the other pole is connected through respective decoupling inductors L1, L2, L3 to the terminals M1, M2, M3 of the three phases of the motor which may be considered as so many receivers respectively dependent on the corresponding phases of the alternator. The field windings, shunted by capacitors C1, C2, C3, have their second terminal connected to the neutral N through respective controlled rectifiers D1, D2, D3, preferably of the dry thyratron type, comprising an anode, a cathode and a control electrode adapted to initiate conductance by the action of an appropriate ignition impulse. Each of the controlled power rectifiers forms a switch unit with its auxiliary circuits comprising for example in the case of the rectifier D1, a capacitor C10 and a controlled extinction rectifier D10, supplemented by a loading circuit comprising, in series with a controlled auxiliary rectifier D11, an auxiliary opposed D.C. source S1 tending to charge the extinction capacitor in the reverse sense to that in which the capacitor would tend to be charged by the action of the main source S. The electrodes controlling the main rectifier D1 and the loading rectifier D11 are connected to respective ignition impulse input terminals EA1, EA11, while the electrode controlling the extinction rectifier D10 is connected to an extinction impulse input terminal ES1. These terminals of the switch unit are respectively connected to corresponding output terminals of a directional filter device K1 which, at two separate input terminals, receives continuous series of extinction and ignition impulses supplied at G1, G2 by an impulse generator G. On respective transmission paths for the ignition and extinction impulses, the directional filter has arresting means shown at K11, K12 dependent on a circuit K10, the circuit K10 being in one or other of its conditions and being adapted to actuate one or other of the arresting means according to whether the potential of an input terminal EE1 is above or below a certain threshold value.

The terminal EE1 forms the output of a bridge formed by the resistance R1 coming from A1, R11 coming from M1, and R10 going to the neutral N; its potential will therefore be zero when the controlled voltage (at M1) is equal and opposed to the reference voltage (at A1) multiplied by the ratio $R11/R1$, and will have positive or negative values according to the variations of the controlled voltage with respect to the reference voltage bearing this multiplication factor; thus a variation-detector comparator is formed, which, in conjunction with the circuit K10, is adapted to give a control signal each time the controlled voltage varies from the reference voltage by a certain amount and in a certain direction. According to whether the control signal represented by the state of the circuit 10 is present or absent, one or other of the arresting means K11, K12 will be activated and as a result the directional filter will direct either the ignition impulses to the terminals EA1 and EA11 or the extinction impulses to the terminal ES1.

Each ignition impulse supplied to the terminals EA1 and EA11 simultaneously initiates or maintains the conductance of the rectifiers D1 and D11; the first connects the winding M1 to the terminals of the source S, while the second closes the circuit for loading the extinction capacitor C10; each extinction impulse initiates or maintains the conductance of the controlled extinction rectifier D10; the capacitor C10, discharging across the terminals of the main rectifier D1, causes the latter to be extinguished.

The switch unit, the directional filter device and the detector comparator, which are associated with the phase A1–M1, as described above, are reproduced identically for the phases A2–M2 and A3–M3 as shown in FIG. 1 with respectively modified reference numbers. However, the impulse generator G supplies the whole of the device, feeding the individual directional filters K1, K2, K3 for the three phases in parallel from its output terminals G1, G2.

According to the embodiment shown in FIG. 2, the generator includes a release oscillator O of the single connection type, which supplies to its output IO a continuous series of impulses (see also FIG. 3) of which the frequency is determined by the time constant of the elements C, R of the oscillator. This frequency is chosen to be greater than the maximum frequency of the voltage liable to be supplied by the reference source, here by the alternator A. The impulses are supplied to the complement input terminal of a bistable circuit B, known as a phase-transformer, so that two series of rectangular impulses which are complementary or out of phase by 180° (lines G1, G2 in FIG. 3) are obtained at the output terminals G1, G2.

Downstream of the respective coupling capacitors CS, CA, for example at the input of the directional filter apparatus K1, the two series are shunted and, after amplification and limiting in the transistorised stages T11, T12 which are normally conductive, take the form (indicated by lines IS and IA in FIG. 3) of two series of impulses which have a frequency half that of the oscillator O and which are out of phase with one another.

The extinction impulses IS are directed by means of an extinction transistor TS1 to the primary of an extinction transformer SS1 of which the secondary, shunted by a diode, feeds the terminal ES1. The ignition impulses IA are supplied by an ignition transistor TA1 to the primary of an ignition transformer AA1 having two secondary windings respectively feeding the terminals EA1 and EA11.

The extinction transistor TS1 has a polarising diode 41 in its emitter circuit, while the ignition transistor TA1 is polarised by two diodes 42 and 43 connected in series; this device provides a threshold, for example of about 0.5 volt, for tripping the extinction transistor and of about 1 volt for tripping the ignition transistor.

The extinction impulses are supplied to the base of the transistor TS1 by means of an arresting or gate transistor XS1 of which the collector is connected for the purpose to the collector of an associated shaping transistor T11 through a Zener diode 44, its emitter being polarised by a diode 45 in series with an emitter-loading resistor 46 to which is connected the base of the extinction transistor TS1.

The base of the arresting transistor XS1 is connected by a connecting resistor 47 to the output X of a rocker circuit including two transistors T13 and T14, the circuit being arranged to follow a transistor TE called a variation detector, to the base of which is supplied the comparison potential appearing at the terminal EE1.

The ignition impulses are supplied to the base of the ignition transistor TA1 and at the same time to the collector of an arresting transistor XA1, which is directly connected to the collector of the associated shaping transistor T12, while its emitter is polarised by a diode 51. The base of XA1 is connected to the collector of a stage known as a reverser stage including a transistor TI1, of which the emitter load comprises a polarising diode 48 and a resistor 49, the base being connected to the already-mentioned output X by a resistor 50.

According to the level of the comparison potential at EE1 relatively to a given threshold, a control signal will be present on, or absent from, the output X. In the absence of the control signal, TE is blocked, as at T14; the low potential of X enables XS1 and therefore TS1 to conduct and the extinction impulses are transmitted. Simultaneously, the conduction of the reversing transistor TI1, keeping pace with that of XS1, blocks XA1 and thus prevents the ignition impulses from being transmitted.

The situation is reversed in the presence of the control signal resulting from the reversing of the rocker circuit and the raising of the potential of X, blocking XS1 and TI1. While the blocking of XS1 stops the transmission of extinction impulses, the blocking of the reversing transistor TI1 enables XA1 to conduct, as is necessary in order to give the ignition impulses a level sufficient to cross the threshold determined by the two series-connected polarising diodes 42 and 43.

The function of the Zener diode 44 associated with the collector of the arresting transistor XS1 is to eliminate the danger of the rocker circuit T13–T14 being disturbed by voltage variations supplied by the shaping stage T11 to the collector of the transistor XS1.

FIG. 4 shows the result of this mode of operation. The reference voltage U(A) starts, for example, at a time $t0$, while the voltage U(M) is still zero, and the variation detector produces the control signal and causes the ignition impulses IA to be diverted to the ignition electrodes. The controlled voltage U(M) rises rapidly from then on until a time $t1$, when the variation detector detects it as being higher than the reference U(A) and makes the control signal disappear by reversing the state of the rocker circuit T13–T14. The directional filter is reversed, and from then on extinction impulses IS are transmitted and cut out the corresponding rectifier. The voltage U(M) then diminishes with the time constant of the receiver, until the time $t2$ when the control signal reappears, and so on.

Thus the action is as if the device were so to speak generating a voltage at the terminals of the receiver, identical in shape with the reference voltage. The stepped undulations which are superimposed on the resultant voltage have a low amplitude owing to the sensitivity of the variation detecting means, and a high frequency, for example 100 times greater than the basic frequency. When such oscillation proves inconvenient it can of course be eliminated by means of appropriate filters, which are all the easier to set up in that the frequency of the undulations is exactly determined by that of the impulse generator.

The invention is not of course limited to the details of the embodiment described above by way of example nor to the particular application considered, although this is an important feature of it. It is obvious both that various equivalents or variants will immediately become apparent to the expert on reading the preceding description in respect of the various constituent members of the device, and also that the application of the invention to supplying any other kinds of receivers can be envisaged. It immediately becomes apparent, particulariy, that the windings in question could, for example, be primary windings of a transformer or group of transformers for adapting to any kind of receiver or group of receivers. Another particular application may consist in supplying a variable direct voltage, defined by a corresponding reference source (a potentiometer for example), to the terminals of a receiver such as a D.C. motor; in this way a D.C. speed varying device can be made in its various possible uses (handling equipment, etc.), and an example of such an embodiment will be described hereafter with reference to FIG. 7.

With more especial reference to the switch units, certain variants may be preferred to the assembly described above with reference to FIG. 1; two such variants are shown in FIGS. 5 and 6, and a third variant will be described in connection with the device illustrated in FIG. 7.

The FIG. 5 variant differs from the assembly described above in that the extinction capacitor C10 loading circuit is applied directly at the terminals of said capacitor.

In the variant shown in FIG. 6, the main rectifiers such as D1 are placed upstream of the phase windings such as M1 and are separated therefrom by shock inductances such as L1. An opposed source SA, which alone provides for the various phases and is connected in series with the main source, feeds the extinction capacitors such as C10 in parallel, through respective auxiliary rectifiers D11 which tend to keep them under a higher loading voltage than that supplied to the associated phase. Each extinction rectifier such as D10 is arranged between the positive terminal of the capacitor and that of the load, but upstream of the shock self-inductance coil such as L1. At the moment when the extinction rectifier is ignited, the opposing voltage from the auxiliary source SA is applied to the terminals of the main rectifier, instantaneously extinguishing the latter before there is any discharge from the extinction capacitor C10, due to the temporary surge which takes place at the terminals of the shock coil L1 prior to the formation of a discharge current in the associated phase M1. Once the surge has passed discharge takes place, but it naturally ceases when the voltage loading the extinction capacitor drops to a value equal to that in the terminals of the load or of the capacitor C1 arranged at the terminals of the latter. The voltage loading the extinction capacitor C10 will thus oscillate between a maximum value equal to the sum of the voltages from the main source S and the auxiliary source SA, and a minimum value slightly below the voltage from the source S. On the other hand, switching will take place with the minimum of loss and heating, since the energy which is transferred at each switching cycle from the extinction capacitors such as C10 to the capacitors such as C1, normally provided at the terminals or the receiver or receivers, is virtually purely reactive.

Referring now to FIG. 7, an example will be described of the invention being applied to feeding a standard D.C. motor M from a battery of accumulators shown at B, subject to control by a pedal (not shown): it is assumed that the speed of a truck or the like is to be controlled, greater or less speed being obtained by greater or less pressure on the pedal. In the embodiment in question the pedal acts on a small rheostat which is indicated by R$h$ in FIG. 7 and may advantageously be a carbon resistor.

The motor M, of which the energising winding is indicated at E$x$, is connected to the positive terminal of the battery B through a low-value resistor S$h$ acting as a shunt, and to the negative terminal of B through a main controlled diode DA arranged in series with an inductance LS called a protective inductance. An extinction circuit formed at the terminals of the DA–LS unit has an extinction capacitor CS and a controlled extinction diode DS; the capacitor CS is connected to the positive terminal of the source by a loading circuit comprising an auxiliary controlled diode DAA and an inductance LA.

The electrodes controlling the controlled diodes DA and DAA are respectively connected through leads EA and EAA to the outputs of a source of ignition impulses formed by an amplification and shaping unit AA; the electrode controlling the extinction diode DS is connected through lead ES to the output of a source of extinction impulses formed by a similar unit AS. The units AA and AS are respectively connected to two outputs of an oscillator O, here in the form of an ordinary multivibrator (not shown); they are also controlled by the respective outputs A and S of a directional filter device BI comprising a bistable element which is adapted to open the unit A and lock the unit B or vice versa, depending on whether the control voltage UC applied to its input is below or above a certain threshold. Such a bistable element may, for example, take the form of a Schmitt unit.

The control voltage UC appears across the output terminals of a variation-detector comparator, here comprising a unit with two transistors TE and TA which act respectively as a variation detector and an amplifier. The unit is fed with an intermediate voltage (BZ) obtained at the terminals of a Zener diode ZZ associated with a resistance RZ. The emitter of TE is connected to the positive terminal of this supply by a resistor 51 and the shunt S$h$; its base is connected thereto through a resistor 52 which, together with the rheostat R$h$ and a resistor 54, forms part of a bridge shunted by a capacitor 55. Two diodes $d1$, $d2$, which are mounted in series at the terminals of the part of the bridge comprising the resistances 52 and R$h$, keep the voltage U at these terminals substantially constant. As a result, the current admitted through the rheostat R$h$ into the resistance 52, and consequently the voltage UD established at the terminals of the latter, is a function of the pressure exerted by the operator on the control pedal. The transistor TE compares this voltage, which thus corresponds to the "demand," with the voltage of UI appearing across the terminals of the shunt S$h$, representing the intensity of the current actually admitted to the motor and hence the torque provided by the latter.

The voltage supplied to the terminals of the loading resistance 56 of the collector of the transistor TE is applied to the base of the amplifying transistor TA, of which the emitter is charged by a resistor 57 and the collector by a resistor 58 shunted by a capacitor 59. The unit formed by the two stages is finally shunted by a capacitor 60.

The control voltage UC applied to the input of the bistable filtering element BI thus reproduces the variations in the difference between the required voltage UD and a voltage UI representing the actual current, rapid fluctuations however being obliterated by the various delaying capacitors 53, 55, 59 and 60; the time constant of the group R-C 58–59 acts in particular to limit the switching frequency to an appropriate value compatible with the characteristics of the device.

The variation-detector transistor TE is also subject to the action of a feedback loop comprising a transistor TR, called a reaction transistor, of which the base is connected through a resistor 61 to the negative terminal of the motor, its collector being kept at the intermediate potential BZ and its emitter connected to the positive terminal of the battery by a Zener diode Z and a resistor 62. The emitter of the transistor TE is connected between these last-mentioned elements by the resistor 63, a resistance-capacitance delay cell 64–65 being connected between the base of TR and one side of the resistor 51.

In this way a feedback loop is formed which acts to reduce the sensitivity of the variation detector TE to the voltage UI, although this action does not intervene effectively except while the main controlled diode DA is conductive, when the resistor 61 is actually connected to the negative terminal of the battery; furthermore this action is delayed by the cell 64–65.

It should finally be noted from FIG. 7 that a diode DR, called a recovery diode, is provided across the terminals of the motor M and the shunt Sh.

The operation of the whole device can be analysed as follows:

At rest, since the control pedal associated with the rheostat Rh is not subjected to any pressure, the resistance of the rheostat is sufficiently high to make the current circulating in the resistor 52 negligible. The voltage UD is insufficient to produce a control voltage UC able to change the state of the filtering device BI; the output S of the device BI activates the unit AS, which emits a continuous series of extinction impulses. Hence the main controlled diode DA remains extinguished and the motor is not energised.

To start the engine it is necessary for the operator to exert a minimum pressure on the pedal. The resistance of the rheostat Rh is reduced, the current admitted into resistor 52 is increased and the voltage UD which is thus generated makes the tranistor TE conductive and produces a control voltage UC which is sufficient to change over the filtering device BI. From then on the unit AS is blocked and the unit AA becomes active and ignition impulses are directed simultaneously to the main diode DA and the auxiliary diode DAA. The motor is energized and the extinction capacitor CS is charged with a voltage higher than that of the battery B, owing to the surge of the oscillating circuit which it forms with the ignition inductance LA.

Figure 8:
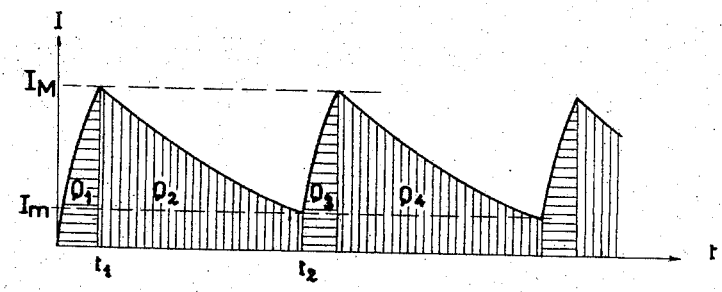
FIGS. 8–10 are diagrams explaining the operation of the device in FIG. 7.

Once the motor is being energised, the current I crossing it increases exponentially, and with it the voltage UI until it reaches a given value, say IM, of current (FIG. 8) at a given time t1. When this happens the control voltage drops below the threshold value for the release of the bistable circuit BI and the latter changes back into its initial state. The extinction diode is ignited and the extinction capacitor CS discharges into the main diode DA through the protective inductance LS, which protects the diodes DA and DS from excessive peak currents. Since the current already existing in the motor cannot be extinguished instantaneously, it continues to circulate through the recovery diode DR, its intensity decreasing exponentially with the time constant determined by the inductance and the resistance of the circuit.

At a given time t2 when the action of the controlled voltage UD again becomes predominant, the control voltage UC again crosses the threshold value of the release of the bistable circuit BI, for a given value Im, and the main diode is reignited. The current I starts rising again in the motor and continues to oscillate thus between the maximum value IM and the minimum value Im.

Figure 9:
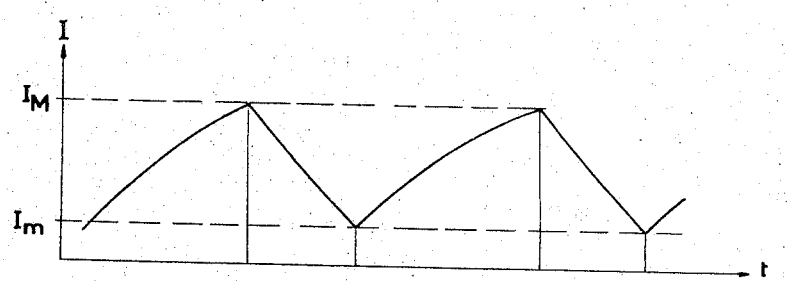
Figure 10:
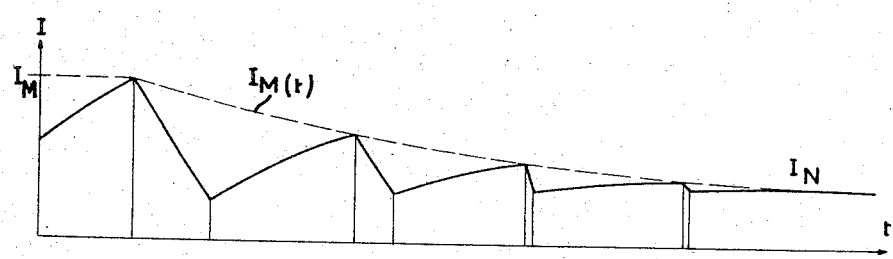

As the motor gathers speed, the rise in the current is slowed down and the fall accelerated, the curve of its variations thus tending to be modified as shown in FIG. 9. As a result the mean value of the voltage at the terminals of the motor is progressively increased. The capacitor 65 is thus progressively loaded and, from the time when its voltage exceeds a threshold determined by the characteristics of the Zener diode Z, the reaction transistor becomes conductive and transmits a voltage to the detector-comparator TE resulting in a reduction of the controlled voltage UD. From then on, the maximum limit IM is reduced (FIG. 10), with a delay determined by the time constant of the circuit containing resistor 64 and capacitor 65, to a new maximum value corresponding to the nominal current IN normally admissible in the motor. When this stage is reached and for as long as the motor is left in this state, a balance is established and the main diode remains ignited until the next intervention by the operator, when he releases the pedal to resume control of the running of the engine.

Thus, both when starting and when accelerating, the delayed feedback loop enables current intensities greater than, for example, three times as great as, the nominal values indicated by the setting of the rheostat Rh to be sent temporarily into the motor.

The presence of the recovery diode and the resulting mode of operation provide a considerable advantage; referring back to FIG. 8, where the hatched surfaces between the curve I(t) and the time co-ordinate represent the amount of electricity passing through the motor, it should be noted that only the quantities Q1, Q3 etc. are really discharged by the battery, while the quantities Q2, Q4, etc. correspond to an actual recovery of the reactive energy accumulated in the motor, due to the possibility of circulation provided by the diode DR. In other words, the mean value of the current actually and usefully passing through the engine is several times greater than the mean value of the current discharged by the battery: there is thus a gain in current which may, for example, reach values of about 10 with the rotor locked. This particularly advantageous mode of operation is made possible by appropriately choosing the commutation frequency as a function of the time constant of the receiver.

Thus important advantages are provided over conventional traction or handling equipment where the starting rheostats have to dissipate large amounts of energy in the form of heat; here one benefits not only from the total elimination of starting rheostats but also from the increased flexibility and sensitivity of the engine, which are made possible by the flexibility of the electronic control and by the peaks of intensity due to the delay of the feedback loop.

It should be noted that the commutation unit shown in the device in FIG. 7 provides the advantage that the auxiliary or opposed source which was necessary in the preceding embodiments can now be dispensed with.

I claim:

1. A servo-control device for regulating, according to a reference voltage, the power applied from a D.C. power source to a load having at least one phase, said device comprising for each phase of the load, in combination:
   (a) switching means having first and second inputs, and responsive to signals at the first input for connecting such source to such load, and responsive to signals at the second input for disconnecting such source from such load, said switching means including a single main controlled rectifier connected in series between such source and such load for conducting substantially all of the current delivered by such source;
   (b) means connected to such load for emitting a control signal only when the magnitude of a voltage proportional to the voltage across such load differs from the magnitude of such reference voltage by more than a given threshold value;
   (c) means for generating a train of pulses at a frequency greater than the basic frequency of the reference voltage; and
   (d) gating means connected between said means for generating a train of pulses and said switching means and connected to said means for emitting a a control signal so as to be actuated by such control signal for transmitting said train of pulses to said first input when the control signal is present, and transmitting the train of pulses to said second input when the control signal is absent.

2. A servo-control device for regulating, according to a reference voltage, the power applied to a load from a D.C. power source, said device comprising, in combination: switching means connected between such source and such load and having first and second inputs, said switching means being responsive to signals at said first input for connecting such source to such load and responsive to signals at said second input for disconnecting such source from such load; means connected to such load for emitting a control signal only when the magnitude of a voltage proportional to the voltage across such load differs from the magnitude of such reference voltage by more than a given threshold value; means for generating a train of pulses at a frequency greater than the basic frequency of the reference voltage; and gating means connected between said means for generating a train of pulses and said switching means and connected to said means for emitting a control signal so as to be actuated by such control signal for transmitting said train of pulses to said first input when the control signal is present, and for transmitting the train of pulses to said first input when the control signal is present, and for transmitting the train of pulses to said second input when the control signal is absent; wherein:

said pulse train generating means includes means for producing two continuous series of pulses, each 180° out of phase with the other, and a first signal path for conveying one of said series of pulses to the first input and a second signal path for conveying the other of said series of pulses to the second input;

said gating means includes rocker circuit means responsive to the presence of the control signal for assuming a first state, and responsive to the absence of the control signal for assuming a second state; and said gating means also includes means for blocking transmission of signals in said first path when the rocker circuit means is in its second state, and means for blocking transmission of signals in said second path when the rocker circuit means is in its first state.

3. A device as defined in claim 2, wherein the means for producing two continuous series of pulses includes a bistable circuit having a complement input and two outputs, each of the latter for generating one of said two continuous series of pulses, and a release oscillator of the single connection type for actuating said complement input.

4. A device is defined in claim 2, wherein said control signal emitting means includes resistive bridge circuit means for fixing the ratio between the load voltage and the reference voltage at which the control voltage will be produced.

5. A device as defined in claim 2, wherein said switching means includes
a main controlled rectifier;
an extinction circuit in parallel with said main controlled rectifier, said extinction circuit including a capacitor and a controlled extinction rectifier; and
means for charging said capacitor, said means including
a D.C. voltage source connected to oppose the D.C. power source, and
an auxiliary controlled rectifier; one of said series of pulses being applied simultaneously to the control electrodes of the main and auxiliary rectifiers, which together constitute said first input.

6. A device as defined in claim 5, wherein said capacitor charging means is connected across the capacitor.

7. A device as defined in claim 2, wherein said switching means includes a main controlled rectifier, said device including
a shock inductance connected in series with the main controlled rectifier, said main controlled rectifier and shock inductance being connected between the D.C. power source and the load,
said switching means including
an extinction circuit connected in parallel with the shock inductance and the load, said extinction circuit including an extinction capacitor connected in series with a controlled extinction rectifier, and
a capacitor charging circuit connected between a point common to the extinction capacitor and controlled extinction rectifier and a point common to the main controlled rectifier and the D.C. power source, said capacitor charging circuit including a D.C. voltage source for charging the extinction capacitor to a voltage greater than that of the D.C. power source, and an auxiliary controlled rectifier.

8. A device as defined in claim 2, wherein said switching means includes
a main controlled rectifier,
a protective inductance in series with said main controlled rectifier,
an extinction circuit connected in parallel with the main controlled rectifier and protective inductance, said extinction circuit including an extinction capacitor in series with a controlled extinction rectifier, and
means for charging the extinction capacitor including an auxiliary controlled rectifier connected in series with an ignition inductance, said charging means being connected between the D.C. power source and a point common to the extinction capacitor and the controlled extinction rectifier.

9. A servo-control device for regulating, according to a reference voltage, the power applied to a D.C. load from a D.C. power source, said device comprising, in combination:
(a) switching means connected between such load and such source and having first and second inputs, and responsive to signals at said first input for connecting such source to such load, and responsive to signals at said second input for disconnecting such source from such load;
(b) means connected to such load for emitting a control signal only when the magnitude of a voltage proportional to the voltage across such load differs from the magnitude of such reference voltage by more than a given threshold value;
(c) means for generating a train of pulses at a frequency greater than the basic frequency of the reference voltage;
(d) gating means connected between said means for generating a train of pulses and said switching means and connected to said means for emitting a control signal so as to be actuated by such control signal for transmitting said train of pulses to said first input when the control signal is present, and transmitting the train of pulses to said second input when the control signal is absent; and
(e) a source of reference voltage including a resistance, rheostat means actuable by a control pedal for controlling the current flowing in said resistance and a resistor connected in series with a D.C. load to be controlled, the voltage proportional to said load voltage being the voltage appearing across said resistor.

10. A device as defined in claim 9, further including a recovery diode connected in parallel with the D.C. load and said resistor connected in series therewith.

11. A device as defined in claim 9, further including feedback loop means for delaying the action of the control signal emitting means.

12. A device as defined in claim 11, wherein said feedback loop means is connected to receive the actual voltage across the load.

13. A servo-control device for regulating, according to a plurality of reference voltages, the power applied to a plurality of loads, each associated with a respective one of said reference voltages, from an associated D.C. power sources, said device comprising, in combination:

(a) a plurality of switching means, each connected in circuit with one of such loads and each responsive to signals at a first input for connecting such a load to its associated source, and responsive to signals at a second input for disconnecting such load from its associated source;

(b) means connected to each such load for emitting a control signal only when the magnitude of the voltage across such associated load differs from the magnitude of the reference voltage associated with such load by more than a given threshold value;

(c) means common to all of said switching means for generating a train of pulses at a frequency higher than the lowest basic frequency of the reference voltages; and (d) means connected between said means for generating a train of pulses and each of said switching means and connected to said means for emitting a control signal so as to be actuated by such control signal for transmitting said train of pulses to the first input of the associated switching means when the control signal from its respective control signal emitting means is present, and transmitting the train of pulses to the second input when said control signal is absent.

14. A servo-control device comprising, in combination:
a load;
a source of D.C. power for energizing said load;
a source of reference voltage;
switching means having an ignition terminal and an extinction terminal, said means being responsive to signals at the ignition terminal for connecting said source to said load, and responsive to signals at the extinction terminal for disconnecting the source from the load;
means connected to said load and to said reference voltage source for emitting a control signal only when the magnitude of a voltage proportional to the voltage across said load differs from the magnitude of the reference voltage by more than a given threshold value;
means for generating a train of pulses at a frequency greater than the basic frequency of the reference voltage; and
means connected between said means for generating a train of pulses and said switching means, and connected to said means for emitting a control signal for transmitting said train of pulses to the ignition terminal when said control signal is present, and transmitting said train of pulses to the extinction terminal when said control signal is absent.

15. A servo-controlled device for regulating, according to a reference voltage, the power applied to a D.C. load from a D.C. power source, said device comprising, in combination:

(a) means for producing a reference D.C. voltage having an arbitrarily variable amplitude;

(b) means connected to such load for producing a voltage proportional to the voltage across such load;

(c) switching means having first and second inputs, said switching means being responsive to signals at said first input for connecting such load to such source and responsive to signals at said second input for disconnecting such source from such load;

(d) means connected to said proportional voltage producing means and to said reference voltage producing means for emitting a control signal only when the magnitude of the voltage proportional to the voltage across such load differs from the magnitude of the reference voltage by more than a given threshold value; and (e) switching control means connected between said means for emitting a control signal and said switching means for supplying an actuating voltage to said first input each time said control signal appears, and for supplying an actuating voltage to said second input each time said control signal disappears.

16. An arrangement as defined in claim 15 wherein said means for producing a proportional voltage is connected in series with such D.C. load, said arrangement further comprising a recovery diode connected in parallel with the series arrangement of such D.C. load and said means for producing a proportional voltage.

17. An arrangement as defined in claim 15 wherein said switching means comprises:
a main controlled rectifier;
a protective inductance in series with said main controlled rectifier;
an extinction circuit connected in parallel with said main controlled rectifier and said protective inductance, said extinction circuit including an extinction capacitor in series with a controlled extinction rectifier; and
means for charging said extinction capacitor including an auxiliary controlled rectifier connected in series with an ignition inductance, said charging means being connected between said D.C. power source and a point common to said extinction capacitor and said controlled extinction rectifier.

18. An arrangement as defined in claim 15 further comprising feedback loop means connected between such load and said control signal emitting means for delaying the action of said control signal emitting means.

References Cited
UNITED STATES PATENTS

| | | | |
|---|---|---|---|
| 2,722,649 | 11/1955 | Immel et al. | 318—138 |
| 3,091,729 | 5/1963 | Schmidt | 321—45 |
| 3,124,735 | 3/1964 | Sampietro et al. | 318—138 |
| 3,124,740 | 3/1964 | Corey et al. | 321—45 |
| 3,137,811 | 6/1964 | Kirk. | |
| 3,138,323 | 9/1964 | Blake et al. | 321—69 X |
| 3,170,107 | 2/1965 | Jessee | 321—65 X |
| 3,178,630 | 4/1965 | Jessee | 321—65 X |
| 3,214,672 | 10/1965 | Watkins | 321—16 |
| 3,223,915 | 12/1965 | Ryerson et al. | 321—18 |
| 3,248,637 | 4/1966 | Albert et al. | 321—18 |

JOHN F. COUCH, *Primary Examiner.*

L. McCOLLUM, *Examiner.*

J. M. THOMSON, W. M. SHOOP, *Assistant Examiners.*